United States Patent
Kim et al.

(10) Patent No.: US 8,700,733 B2
(45) Date of Patent: Apr. 15, 2014

(54) METHOD AND APPARATUS FOR EXECUTING APPLICATION OF MOBILE DEVICE

(75) Inventors: Joo Hyun Kim, Gyeonggi-do (KR); Byung Woan Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 76 days.

(21) Appl. No.: 13/283,190

(22) Filed: Oct. 27, 2011

(65) Prior Publication Data

US 2012/0131228 A1    May 24, 2012

(30) Foreign Application Priority Data

Nov. 22, 2010  (KR) .......................... 10-2010-0115962

(51) Int. Cl.
*G06F 15/16*   (2006.01)

(52) U.S. Cl.
USPC ........... 709/217; 709/208; 709/210; 709/219; 709/229; 710/5; 710/14; 710/63

(58) Field of Classification Search
None
See application file for complete search history.

(56) References Cited

U.S. PATENT DOCUMENTS

| | | | | |
|---|---|---|---|---|
| 5,379,389 A * | 1/1995 | Whisler | | 710/5 |
| 6,070,236 A * | 5/2000 | Winter | | 712/209 |
| 6,360,364 B1 * | 3/2002 | Chen et al. | | 711/169 |
| 6,748,423 B1 * | 6/2004 | Khanna et al. | | 709/210 |
| 7,461,135 B2 * | 12/2008 | Murayama et al. | | 709/217 |
| 7,765,254 B2 * | 7/2010 | Hariharan et al. | | 709/201 |
| 7,912,994 B2 * | 3/2011 | Cornwell et al. | | 710/14 |
| 8,458,250 B2 * | 6/2013 | Sivasubramanian et al. | . | 709/203 |
| 2002/0188736 A1 * | 12/2002 | Jarvensivu | | 709/229 |
| 2005/0066069 A1 * | 3/2005 | Kaji | | 710/1 |
| 2005/0182958 A1 * | 8/2005 | Pham et al. | | 713/200 |
| 2006/0037029 A1 * | 2/2006 | Yamada | | 719/327 |
| 2006/0050060 A1 * | 3/2006 | Chang | | 345/173 |
| 2007/0083610 A1 * | 4/2007 | Treder et al. | | 709/217 |
| 2008/0052755 A1 * | 2/2008 | Pham et al. | | 726/1 |
| 2008/0250172 A1 * | 10/2008 | Tanaka | | 710/63 |
| 2009/0268754 A1 * | 10/2009 | Palm et al. | | 370/466 |
| 2009/0307679 A1 | 12/2009 | Lee et al. | | 717/168 |
| 2010/0077061 A1 * | 3/2010 | Hsueh et al. | | 709/219 |
| 2011/0016256 A1 * | 1/2011 | Hatada | | 710/316 |
| 2011/0072186 A1 * | 3/2011 | Cheng | | 710/315 |

FOREIGN PATENT DOCUMENTS

EP   1 672 509   6/2006   ............. G06F 12/00

OTHER PUBLICATIONS

'Universal Serial Bus Specification' Revision 2.0, Apr. 27, 2000, pp. i, ii, 250-256.*
Wikipedia's article on 'iPod Classic' from Sep. 11, 2010.*
Wikipedia's article on 'iPad' from Nov. 16, 2010.*

* cited by examiner

*Primary Examiner* — Steven Snyder
(74) *Attorney, Agent, or Firm* — The Farrell Law Firm, P.C.

(57) ABSTRACT

An apparatus and method for executing an application within a mobile device is provided. The method includes detecting, by the mobile device, a connection with a host device through a wired interface; receiving, from the host device, a request to execute a specific application installed in the mobile device; and executing the specific application according to the received request.

16 Claims, 6 Drawing Sheets

METHOD AND APPARATUS FOR EXECUTING APPLICATION OF MOBILE DEVICE

PRIORITY

This application claims priority under 35 U.S.C. §119(a) to a Korean Patent Application filed in the Korean Intellectual Property Office on Nov. 22, 2010 and assigned Serial No. 10-2010-115962, the entire content of which is incorporated herein by reference.

BACKGROUND OF THE INVENTION

1. Field of the Invention

The present invention relates generally to application execution technology for mobile devices and, more particularly, to a method and apparatus for enabling an external device to execute an application installed in a mobile device when the external device is connected to the mobile device through a serial port.

2. Description of the Related Art

Typically, when a mobile device is connected to an external device through a Universal Serial Bus (USB) serial port, device permission for the mobile device is granted according to an application installed in the mobile device. More specifically, such an application has exclusive device permission, and all communicated data is processed directly by the application. Therefore, an external device cannot execute or control any application installed in the mobile device.

Meanwhile, a mobile device (e.g., a mobile phone, a Portable Multimedia Player (PMP), etc.) has a limited amount of space for mounting its components. To overcome such limitations, the mobile device may integrate various interfaces, such as an external storage device, a modem, and/or a serial port, with a single USB connection. However, in case of such interfaces, when an Operating System (OS) or any other applications installed in the mobile device are executed, such applications have exclusive authority for connections with external devices. Therefore, the external device does not have authority to execute or control any application installed in the mobile device.

BRIEF SUMMARY OF THE INVENTION

Accordingly, the present invention is provided to address the above-mentioned problems and/or disadvantages and to offer at least the advantages described below.

An aspect of the present invention provides a method and apparatus for allowing an external device to execute an application installed in a mobile device when the external device is connected to the mobile device through a serial port.

Another aspect of the present invention provides a method and apparatus for allowing an external device to change a connection mode of a mobile device to a serial port mode when the external device is connected to the mobile device through any interface. In this case, an application installed in the mobile device being in the serial port mode may be executed and controlled by the external device.

According to one aspect of the present invention, a method for executing an application within a mobile device is provided The method includes detecting, by the mobile device, a connection with a host device through a wired interface; receiving, from the host device, an execution request for a specific application installed in the mobile device; and executing the specific application according to the received request.

According to another aspect of the present invention, an application execution apparatus of a mobile device is provided. The apparatus includes a wired interface for detecting a connection with a host device; and a serial port server module for, upon receiving an execution request for a specific application installed in the mobile device from the host device, executing the specific application according to the execution request.

BRIEF DESCRIPTION OF THE DRAWINGS

The above and other aspects, advantages, and features of certain embodiments of the present invention will become apparent to those skilled in the art from the following detailed description taken in conjunction with the accompanying drawings, in which.

DETAILED DESCRIPTION OF EMBODIMENTS OF THE PRESENT INVENTION

Non-limiting embodiments of the present invention are described in more detail herein with reference to the accompanying drawings. Well-known or widely used techniques, elements, structures, and processes may not be described or illustrated in detail to avoid obscuring the essence of the present invention. Although the drawings represent certain embodiments of the invention, the drawings are not necessarily to scale and certain features may be exaggerated or omitted in order to better illustrate and explain the present invention.

Among terms set forth herein, the term "external device" refers to a device that exists separately from and operates independently of a mobile device. Herein, such an external device may also be referred to as a host device, since an external device according to embodiments of the present invention can control a mobile device.

Additionally, the term "serial port" refers to a type of input/output port installed in a mobile device or a host device. A serial port is a serial communication physical interface through which information transfers in or out one bit at a time. Although are described with reference to use of a serial port as an interface through which a mobile device and a host device are connected, the present invention is not limited thereto, and other interfaces may be used in accordance with embodiments of the present invention.

Figure 1:
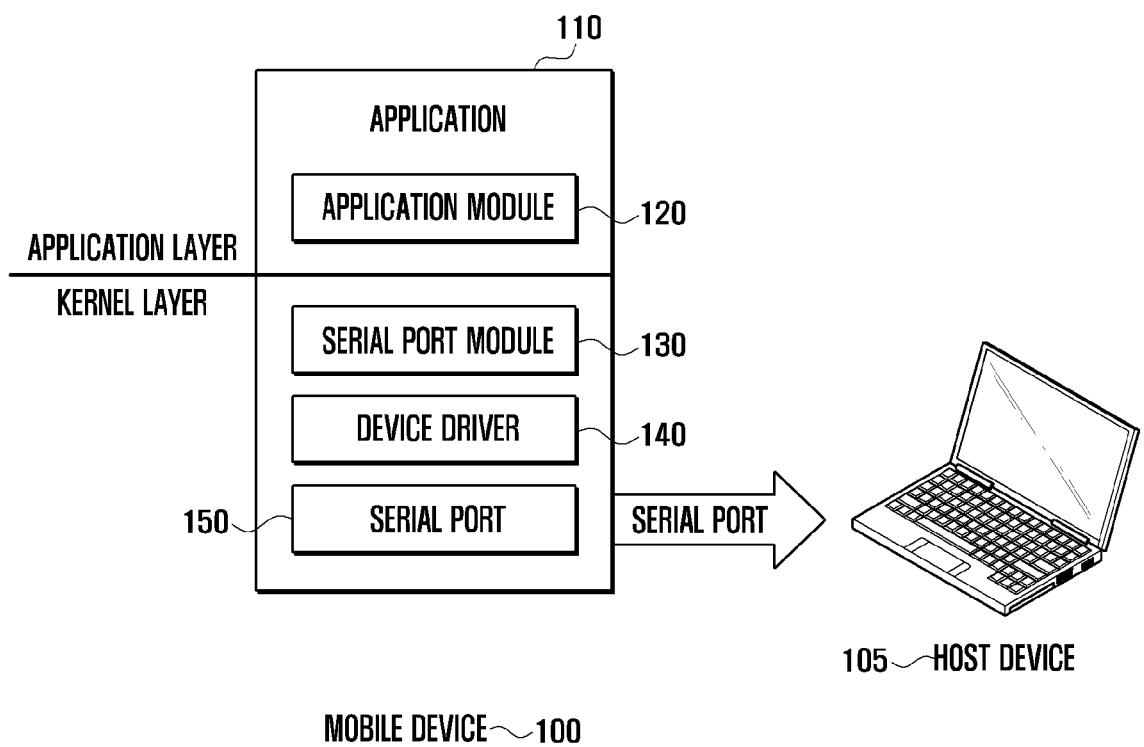
FIG. 1 is a schematic diagram illustrating a connection scheme between a mobile device and a host device.

FIG. 1 is a schematic diagram illustrating a connection scheme between a mobile device and a host device.

As shown in FIG. 1, an application 110 installed in a mobile device 100 may include an application layer and a kernel layer.

The application layer includes an application module 120, which has identification information and execution information (i.e., the executable program code) about the installed application.

The kernel layer includes a serial port module 130, a device driver 140, and a serial port 150.

The serial port module 130 converts a hardware event or any other event physically occurring at a lower layer into a software event and then forwards the converted event to an upper layer, or converts a software event occurring at an upper layer into a hardware event and then forwards the converted event to a lower layer.

The device driver 140 operates as a part of a kernel and controls at least one host device connected thereto. The device driver 140 is software composed of function sets that interact with other parts of a kernel through a predefined interface.

The serial port 150 is a wired interface that physically connects the mobile device 100 and a host device 105. The serial port 150 sends and/or receives data one bit at a time. Although the serial port 150 described herein is used as a wired interface for connecting the mobile device and the host device is, wireless interfaces may alternatively be used in accordance with embodiments of the present invention.

According to the above-described connection scheme between the mobile device 100 and the host device 105, device permission for the mobile device 100 is provided with respect to an application installed in the mobile device 100. Therefore, according to a conventional implementation, a host device 105 would not be permitted to execute or control an application installed in the mobile device 100.

In order to address the above-described problems, embodiments of the present invention provide a method and apparatus for allowing a host device to execute an application installed in a mobile device when the host device is connected to the mobile device through a serial port, as will be described hereinafter.

Figure 2:
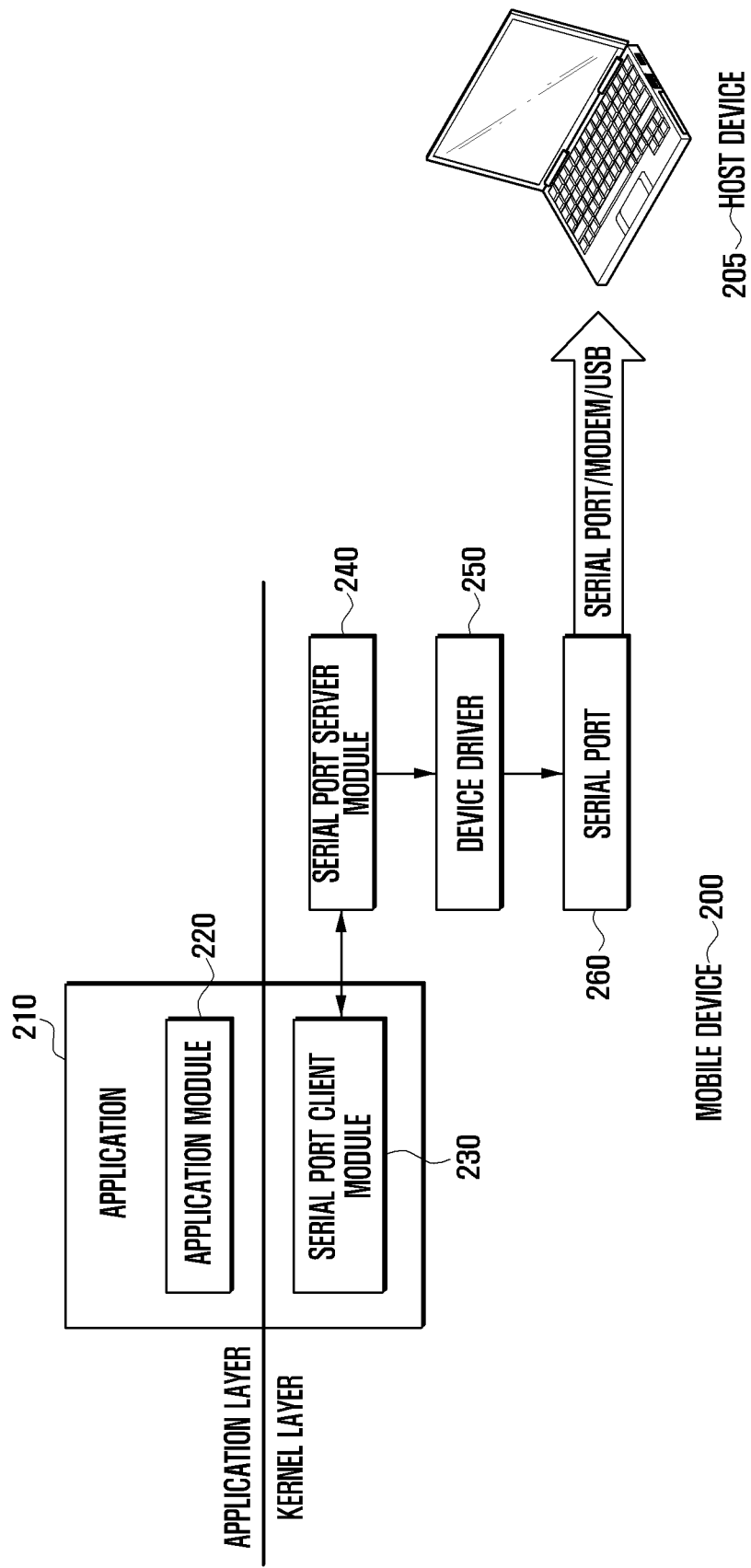
FIG. 2 is a schematic diagram illustrating a connection scheme between a mobile device and a host device in accordance with an embodiment of the present invention.

FIG. 2 is a schematic diagram illustrating a connection scheme between a mobile device 200 and a host device 205 in accordance with an embodiment of the present invention.

Referring to FIG. 2, an application 210 installed in the mobile device 200 may include an application layer and a kernel layer.

The application layer includes an application module 220, which has identification information and execution information (i.e., executable program code) about the installed application.

The kernel layer includes a serial port client module 230 within the application 210, and further includes a serial port server module 240, a device driver 250, and a serial port 260 external to the application 210.

The serial port client module 230 provides an interface for connecting the application module 220 to the serial port server module 240. The serial port client module 230 may send or receive data to and/or from the serial port server module 240 by using an appropriate technique such as Inter-Process Communication (IPC), a pipeline, a shared memory, etc.

According to some embodiments of this invention, the serial port client module 230 may receive an application function run command from the serial port server module 240 and forward the received application function run command to the application module 220. Then, the application module 220 receives the application function run command from the serial port client module 230 and controls a specific application to perform a particular function corresponding to the received command.

If the application is a music player, for example, the serial port client module 230 may receive a play command from the serial port server module 240 and deliver the received play command to the application module 220. Then, the application module 220 controls the music player to play a selected music file.

The serial port server module 240 receives, from the host device 205, a control command for changing a connection mode of the mobile device 200 to a serial port mode. Then, depending on the received command, the serial port server module 240 changes a connection mode of the mobile device 200 to a serial port mode.

If the mobile device 200 is connected to the host device 205 through a wired interface such as USB, for example, the wired interface may provide various functions for using the mobile device 200 as an external storage device, a modem, a serial port, etc. When using a USB connection, if the wired interface is initially set to use the mobile device 200 as an external storage device, a change to a serial port mode is required. In order for this change to occur, the serial port server module 240 receives, from the host device 205, a control command for changing a serial port mode and then changes a mode of the mobile device 200 to a serial port mode.

Additionally, the serial port server module 240 receives an application execution command from the host device 205 connected to the mobile device 200. Upon receiving the application execution command, the serial port server module 240 controls the execution of a specific application installed in the mobile device 200.

Furthermore, the serial port server module 240 receives an application function run command from the host device 205 connected to the mobile device 200. Upon receiving the application function run command, the serial port server module 240 forwards the received command to the serial port client module 230 so that a particular function may be performed.

Meanwhile, according to some embodiments of this invention, the serial port server module 240 is executed independently of the serial port client module 230. A detailed internal configuration of the serial port server module 240 is described later herein with reference to FIG. 3.

The device driver 250 operates as a part of a kernel and controls at least one host device connected thereto. The device driver 250 is software including function sets that interact with other parts of a kernel through a predefined interface. According to embodiments of this invention, the device driver 250 receives data and/or a control signal from the host device 205 and then forwards the received data and/or control signal to the serial port server module 240. More specifically, the device driver 250 may receive at least one of an application execution command and an application function run command from the host device 205 and then forward the received at least one command to the serial port server module 240.

The serial port 260 is a wired interface that physically connects the mobile device 200 and the host device 205. The serial port 260 sends and/or receives data one bit at a time. Although the serial port 260 described herein uses a wired interface for connecting the mobile device and the host device, a wireless interface may be used in accordance with embodiments of the present invention.

Figure 3:
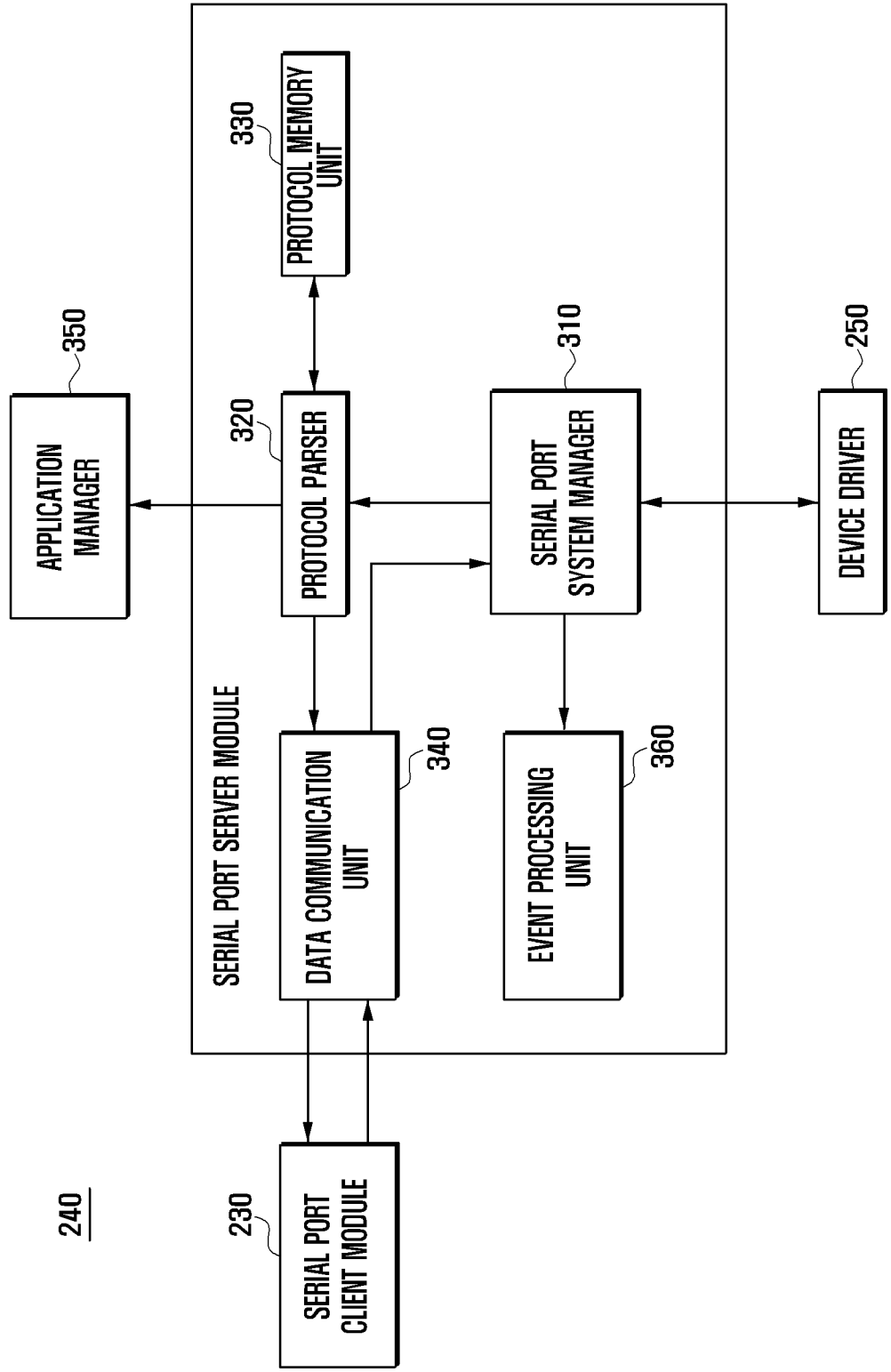
FIG. 3 is a block diagram illustrating a detailed internal configuration of a serial port server module shown in FIG. 2.

FIG. 3 is a block diagram illustrating a detailed internal configuration of a serial port server module 240 shown in FIG. 2. Referring to FIG. 3, the serial port server module 240 may include a serial port system manager 310, a protocol parser 320, a protocol memory unit 330, a data communication unit 340, an application manager 350, and an event processing unit 360.

The serial port system manager 310 receives data and/or a control signal (e.g., a command) from the device driver 250 located at a lower layer and forwards the received data and/or control signal to the protocol parser 320. Also, the serial port system manager 310 receives data or a control signal from the data communication unit 340 and forwards the received data and/or signal to the device driver 250. Additionally, when detecting an event such as a connection of the host device 205, the serial port system manager 310 sends the detected event to the event processing unit 360.

The protocol parser 320 parses data and/or control signal received from the serial port system manager 310 according to a relevant protocol. If any command is recognized as a result of parsing, the protocol parser 320 checks the protocol memory unit 330 in order to determine whether the recognized command is predefined.

The protocol memory unit 330 may store predefined commands, which are exemplarily shown in Table 1.

TABLE 1

| Command | Description |
| --- | --- |
| AT+OSPSERIALOPEN (Mode Change Request) | Activates the serial communication feature on the device.<br>Remarks: The serial communication feature is deactivated when the user disconnects the USB cable.<br>A command for changing a connection mode of the mobile device to a serial port mode |
| Osp:Msg='Hello' (Current Mode Check Request) | Checks availability of the serial communication feature. If the port is available, the device returns "Osp:Msg='OK'". Uses "{Message}" for the conditional launch.<br>A command for checking whether a connection mode of the mobile device is changed to a serial port mode |
| Osp:Req='{Message}' (Application Execution Request) | See also:<br>App::AppManager::RegisterAppLaunch( )<br>A command for executing an application installed in the mobile device |
| Osp:Res='Success|Fail' (Application Execution Response) | It is the response message for "Osp:Req".<br>A command for responding with application execution results such as success and failure |

Namely, the protocol parser 320 determines whether a received command is pre-stored (i.e., predefined) in the protocol memory unit 330. Upon the determination, the protocol parser 320 forwards a non-stored command to the data communication unit 340. A non-stored command may be an application function run command, such as a play command for a music player, for example.

Meanwhile, the protocol parser 320 further determines whether pre-stored commands allow may be self-processed. If any pre-stored command is a self-processable command (i.e., if any pre-stored command can be processed by the protocol parser 320), the protocol parser 320 processes the command and returns a response according to the command. If any pre-stored command is a non-self-processable command, the protocol parser 320 forwards the command to the application manager 350. A self-processable command may include commands such as a mode change request and a current mode check request, and a non-self-processable command may include commands such as an application execution request.

According to some embodiments of the present invention, if a prefix of the received command contains "Osp" (see Table 1), the protocol parser 320 may not forward the command to the data communication unit 340.

The data communication unit 340 may include a data receiver (not shown) and a data transmitter (not shown). The data communication unit 340 receives a command (e.g., an application function run command) from the protocol parser 320 and forwards the received command to the serial port client module 230. The data communication unit 340 may receive a command (e.g., an application function run command) from the serial port client module 230 and forward the received command to the serial port system manager 310.

The application manager 350 receives a command (especially, an application execution command) from the protocol parser 320 and executes a requested application. According to some embodiments of this invention, in order to identify and execute a specific application, the application manager 350 may store information about applications installed in the mobile device 200, especially information for identifying a requested application.

The event processing unit 360 receives an event in connection with a connection occurring at the serial port 260 or an event regarding a system failure from the serial port system manager 310 and then processes the received event.

Figure 4:
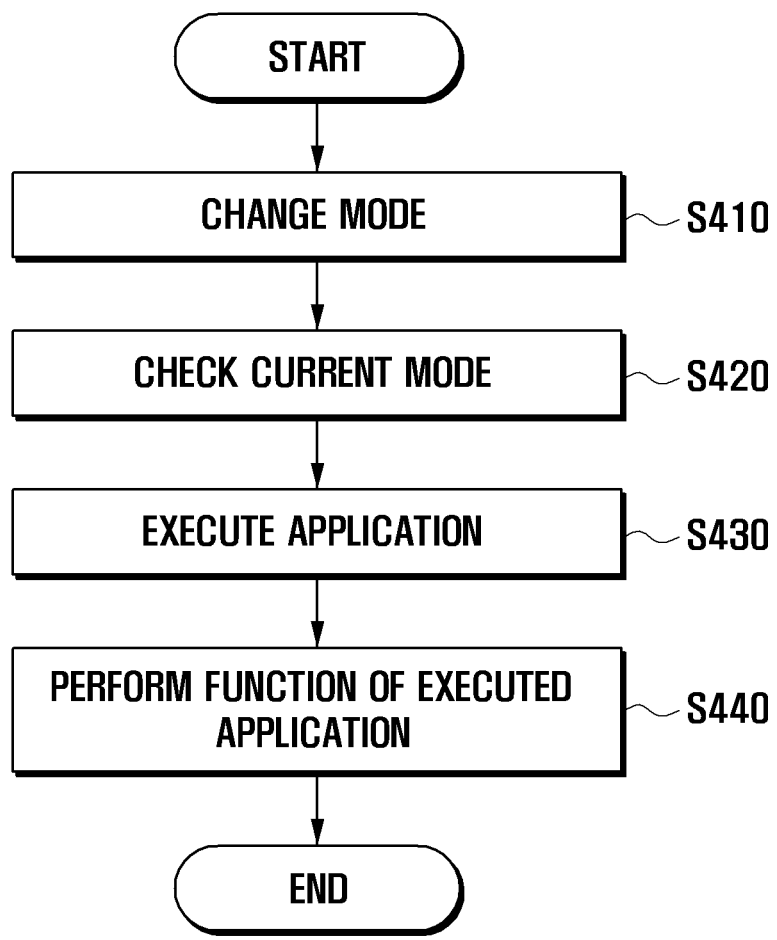
FIG. 4 is a flow diagram illustrating a basic process for executing an application of a mobile device in accordance with an embodiment of the present invention.

FIG. 4 is a flow diagram illustrating a basic process for executing an application of a mobile device 200 in accordance with an embodiment of the present invention.

As discussed above, if the mobile device 200 is connected to the host device 205 through a wired interface such as USB, the wired interface may offer various functions for using the mobile device 200 as an external storage device, a modem, a serial port, or the like. When using a USB connection, if the wired interface is initially set to use the mobile device 200 as an external storage device, a change to a serial port mode is required.

Referring to FIG. 4, in performing the change to the serial port mode, when receiving a mode change request from the host device 205, the mobile device 200 changes a connection mode to a serial port mode, in step S410. When receiving a current mode check request from the host device 205, the mobile device 200 checks a current mode and responds, in step S420. Meanwhile, according to some embodiments of this invention, the mobile device 200 may change a serial port mode again into a connection mode, such as a modem mode, upon detecting a disconnection with the host device 205.

After a change to a serial port mode is performed, the mobile device 200 may receive an application execution request from the host device 205. Then, the mobile device 200 executes the requested application, in step S430.

Since applications installed in the mobile device normally have exclusive device permission for a connection between the mobile device and any external device, the external device cannot execute applications installed in the mobile device. However, according to embodiments of this invention, even when the mobile device is connected to the external device, the external device can offer, to the mobile device, a command to execute an application installed in the mobile device through the serial port. Then, the mobile device, upon receiving such an application execution command, executes the requested application. Accordingly, the external device can execute an application installed in the mobile device.

After an application execution, the mobile device 200 may receive a command to perform a particular function of the executed application from the host device 205. Then the mobile device 200 performs the requested function, in step S440.

Figure 5:
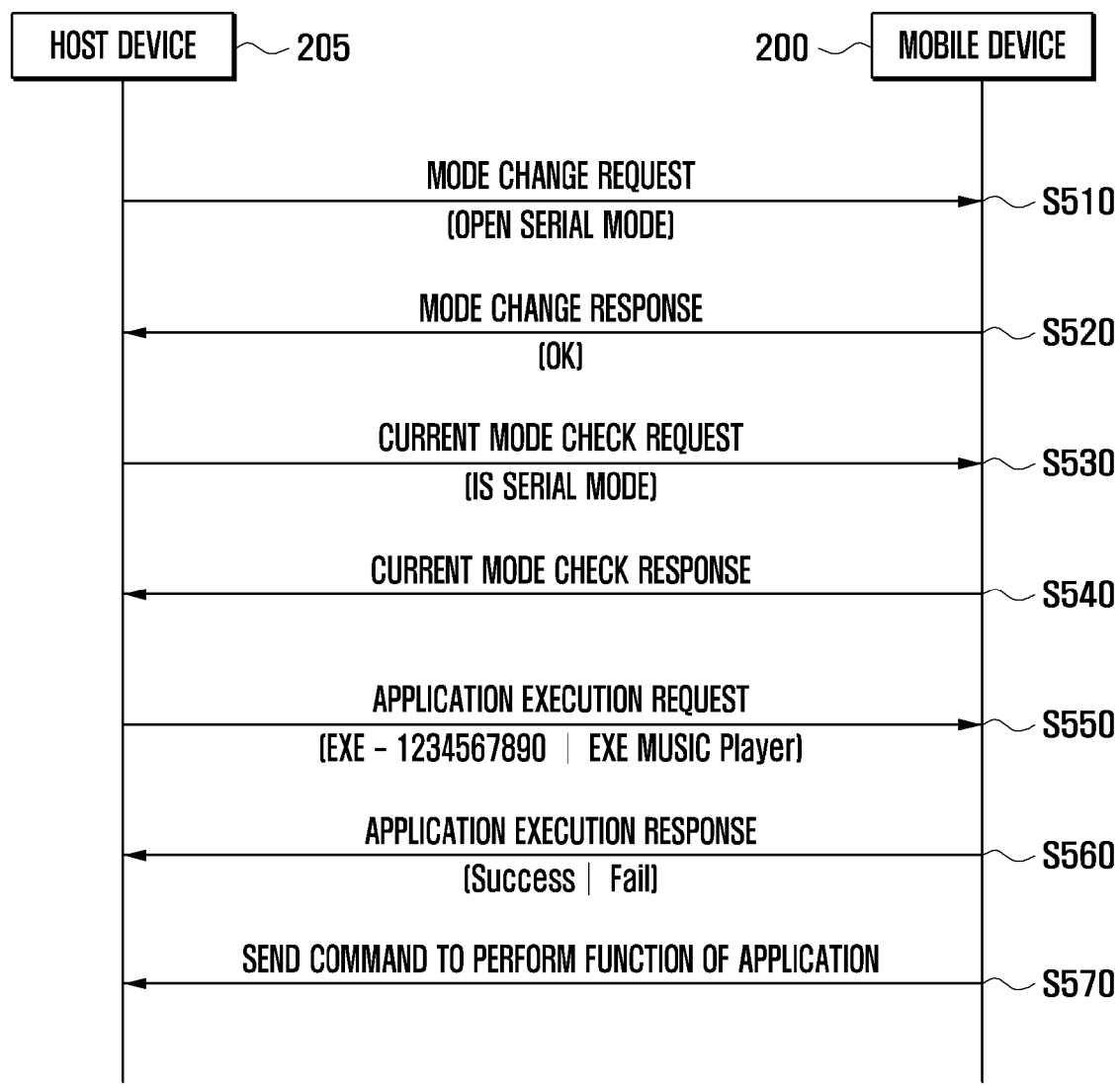
FIG. 5 is a flow diagram illustrating a detailed process for executing an application of a mobile device in accordance with an embodiment of the present invention.

FIG. 5 is a flow diagram illustrating a detailed process for executing an application of a mobile device 200 in accordance with an embodiment of the present invention.

Referring to FIG. 5, the host device 205 sends a mode change request for changing a connection mode of the mobile device to a serial port mode, in step S510. If the mobile device 200 is already operating in the serial port mode, step S510 may be omitted.

Upon receiving the mode change request, the mobile device 200 changes the connection mode to the serial port mode and then sends a mode change response to the host device 205, in step S520. If the mobile device 200 does not support the serial port mode, or fails to perform the mode change, the mobile device 200 may not respond or may send a failure response to the host device 205.

Additionally, the host device 205 may send a current mode check request to check a current connection mode of the mobile device 200, in step S530. Then the mobile device 200 sends a current mode check response to the host device 205 in response to the received request, in step S540. If the mobile device 200 does not support the serial port mode, or fails to perform a mode change, the mobile device 200 may not respond or may send a failure response. In case of operating in another connection mode, the mobile device 200 may send an invalid response message.

After the connection mode of the mobile device 200 is changed to the serial port mode, the host device 205 sends an application execution request for executing any application installed in the mobile device 200 to the mobile device 200, in step S550. The application execution request may contain an IDentification (ID) or type for identifying an application to be executed. If the requested application has already been installed in the mobile device 200 and is executable, the mobile device 200 executes the requested application. Upon executing the application, the mobile device 200 sends an application execution response indicating an execution success to the host device 205, in step S560.

However, if the requested application has not already been installed in the mobile device 200 or execution of the application fails, the mobile device 200 sends an application execution response indicating a failure in execution to the host device 205, in step S560.

If the application is successfully executed, the host device 205 and the mobile device 200 send and receive commands to perform functions of the application to and from each other, in step S570.

Figure 6:
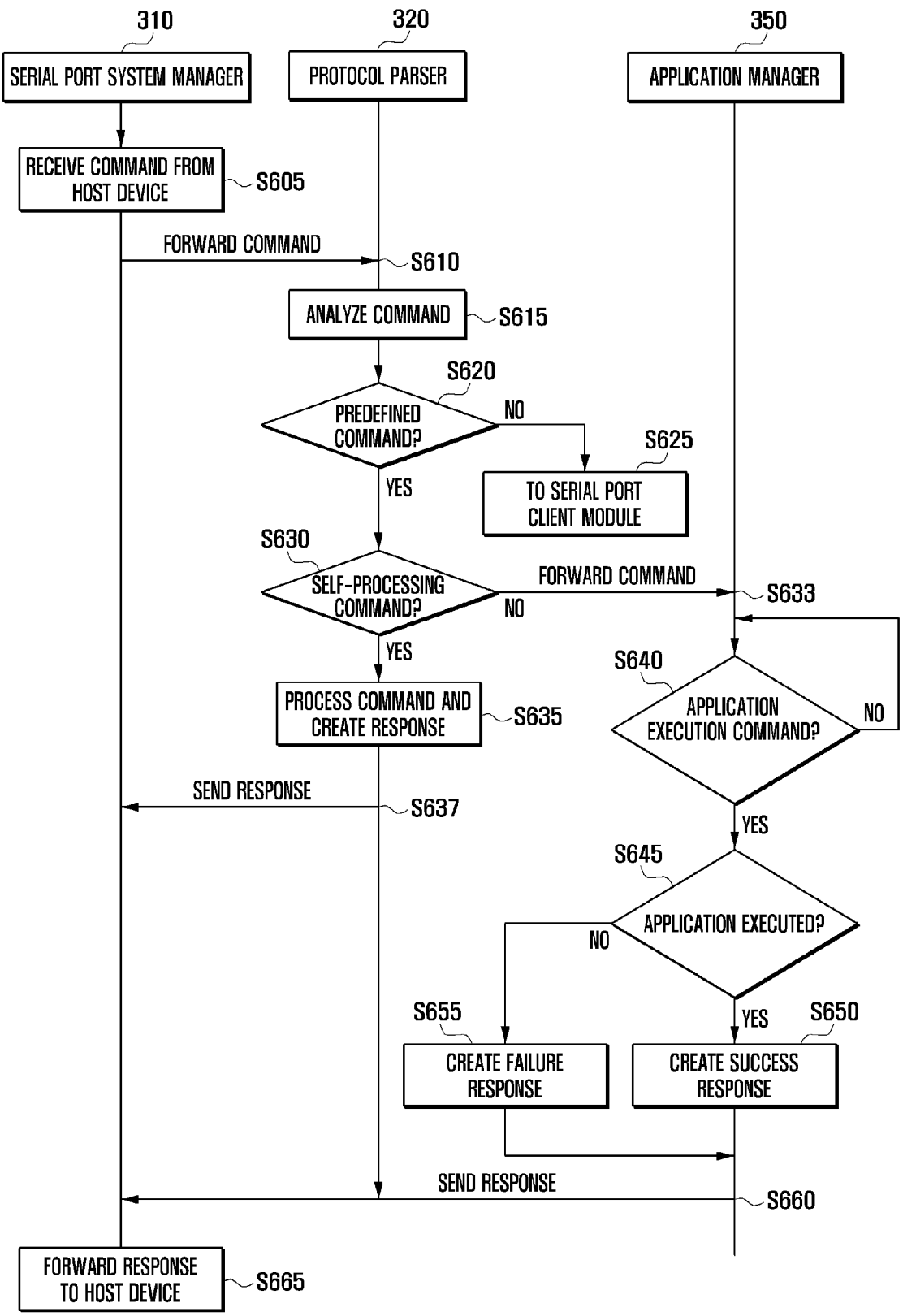
FIG. 6 is a flow diagram illustrating a signal flow between internal blocks of a mobile device when an application of the mobile device is executed in accordance with an embodiment of the present invention.

FIG. 6 is a flow diagram illustrating a signal flow between internal blocks of a mobile device 200 when an application of the mobile device 200 is executed in accordance with an embodiment of the present invention.

In the example described with reference to FIG. 6, it is assumed that the mobile device 200 is connected to the host device 205 through a wired interface, but a wireless interface may be used in accordance with embodiments of the present invention. When any command is offered to the mobile device 200 by the host device 205, this command is forwarded to the serial port system manager 310 through the device driver 250, in step S605. This command may include predefined commands, as shown in Table 1, as well as any other commands for performing functions of the application.

Then the serial port system manager 310 forwards the received command to the protocol parser 320, in step S610. The protocol parser 320 analyzes a command received from the serial port system manager 310, in step S615 and, depending on analysis results, checks whether the received command is a predefined command, in step S620. In determining whether the received command is a predefined command, the protocol parser 320 may compare the parsed command with a command list stored in the protocol memory unit 330. If the parsed command is contained in the command list of the protocol memory unit 330, the protocol parser 320 regards the received command as a predefined command. If the parsed command is not contained in the command list of the protocol memory unit 330, the protocol parser 320 regards it as a non-predefined command.

According to some embodiments of this invention, a mode change request, a current mode check request, and an application execution request, all of which are shown in Table 1, are predefined commands. However, an application function run command is a non-predefined command.

If the parsed command is a non-predefined command, the protocol parser 320 forwards the parsed command to the serial port client module 230, in step S625. This command is forwarded to the application module 220 to perform a relevant function of the application.

However, if the parsed command is a predefined command, the protocol parser 320 determines whether self-processing of the command by the protocol parser 320 is permitted, in step S630. According to some embodiments of this invention, a mode change request and a current mode check request may be self-processable commands that can be processed by the protocol parser 320.

In case of a self-processable command, the protocol parser 320 processes the command and creates a response indicating processing results, in step S635, and sends the created response to the serial port system manager 310, in step S637. This response is forwarded to the host device 205 through the device driver 250.

When the command is a non-self-processable command, the protocol parser 320 forwards the command to the application manager 350, in step S633. Upon receiving the command, the application manager 350 determines whether the received command is an application execution command, in step S640.

If the received command is an application execution command, the application manager 350 tries to execute a specific application according to the command, in step S645. In this step, the application manager 350 can identify the specific application to be executed, using type, identifier, etc. contained in an application execution request.

After attempting to execute the application, the application manager 350 performs either step S650 or S655 according to whether the application is successfully executed. If the application is successfully executed, the application manager 350 creates a success response, in step S650, but if the application fails to be executed, the application manager 350 creates a failure response, in step S655. The application manager 350 sends the created response to the serial port system manager 310 through the protocol parser 320, in step S660.

The serial port system manager 310 forwards the received response to the host device 205, in step S665.

As described herein, when the mobile device 200 is connected to the host device 205 through an interface, a connection mode of the mobile device 200 can change to a serial port mode at the request of the host device 205. Additionally, any application installed in the mobile device 200 operating in the serial port mode can be executed and controlled by the host device 205.

While this invention has been shown and described with reference to particular embodiments thereof, it will be understood by those skilled in the art that various changes in form and details may be made therein without departing from the spirit and scope of the invention as defined by the appended claims.

What is claimed is:

1. A method for executing an application within a mobile device from among a plurality of applications installed in the mobile device that are each identified by a respective application IDentifier (ID), the method comprising:

detecting, by the mobile device, a connection with a host device through a wired interface;
receiving, from the host device, by a serial port server module, a request for executing a specific application installed in the mobile device, the request comprising an application ID corresponding to the specific application;
identifying the specific application installed in the mobile device based on the application ID of the request received from the host device;
executing the identified application according to the received request;
receiving,. from the host device, by a serial port system manager included in the serial port server module, a command:
analyzing, by a protocol parser included in the serial port server module, the received command and processing or forwarding the analyzed command:
determining, by the protocol parser, whether the received command is a predefined command by comparing the received command with predefined commands stored in the protocol memory unit, and if the received command is not a predefined command, forwarding the received command to a serial port client module through a data communication unit.

2. The method of claim 1, wherein the wired interface is a serial port.

3. The method of claim 1, wherein detecting the connection includes:
receiving a mode change request from the host device; and
if a connection mode of the mobile device is not a serial port mode, changing the connection mode to the serial port mode.

4. The method of claim 3, wherein detecting the connection further includes:
after changing the connection mode to the serial port mode, receiving a current mode check request from the host device; and
responding to the current mode check request after checking a current connection mode of the mobile device.

5. The method of claim 1, further comprising:
after executing the identified application, receiving, from the host device, an application function run command for the specific application; and
identifying a particular function of the identified application according to the received application function run command;
performing the identified particular function.

6. An application execution apparatus of a mobile device for executing an application from among a plurality of applications installed in the mobile device that are each identified by a respective application IDentifier (ID), the apparatus comprising:
a wired interface for detecting a connection with a host device; and
a serial port server module for, receiving, from the host device, an execution request comprising an application ID of a specific application installed in the mobile device for requesting execution of the specific application installed in the mobile device, identifying the specific application installed in the mobile device based on the application ID of the execution request received from the host device, and executing the identified application according to the execution request,
wherein the serial port server module includes:
a serial port system manager for receiving a command from the host device; and
a protocol parser for analyzing the received command and for processing or forwarding the analyzed command, and
wherein the protocol parser determines whether the received command is a predefined command by comparing the received command with the predefined commands stored in the protocol memory unit, and if the received command is not a predefined command, the protocol parser forwards the received command to a serial port client module through a data communication unit.

7. The apparatus of claim 6, wherein the wired interface is a serial port.

8. The apparatus of claim 7, wherein the serial port server module forwards the received request to an external block when a function run request for the executed application is received from the host device.

9. The apparatus of claim 8, further comprising:
the serial port client module for receiving the function run request from the serial port server module and forwarding the received request to an application module.

10. The apparatus of claim 9, wherein the serial port server module includes:
a protocol memory unit for storing predefined commands;
an application manager for, upon receiving an application execution command, identifying a specific application from the application execution command and executing the identified specific application from the application execution command according to the application execution command; and
the data communication unit for providing an interface between the serial port server module and the serial port client module.

11. The apparatus of claim 6, wherein, if the received command is the predefined command, the protocol parser determines whether the received command is a self-processing command, and if the received command is the self-processing command, the protocol parser processes the received command, creates a response according to the processed command, and sends the response to the serial port system manager.

12. The apparatus of claim 11, wherein, if the received command is a non-self-processing command, the protocol parser forwards the received command to the application manager.

13. The apparatus of claim 12, wherein the application manager identifies and executes the specific application from the application execution command when the command received from the protocol parser is the application execution command.

14. The apparatus of claim 13, wherein the predefined commands stored in the protocol memory unit include at least one of a mode change request for changing a connection mode of the mobile device to a serial port mode, a current mode check request for checking whether the connection mode of the mobile device is changed to the serial port mode, an application execution request for executing an application installed in the mobile device, and an application execution response for providing a response indicating application execution results.

15. The apparatus of claim 11, wherein the self-processing command includes a mode change request for changing a connection mode of the mobile device to a serial port mode, and a current mode check request for checking whether the connection mode of the mobile device is changed to the serial port mode.

16. The apparatus of claim 12, wherein the non-self-processing command includes an application execution request for executing an application installed in the mobile device.

\* \* \* \* \*